United States Patent Office

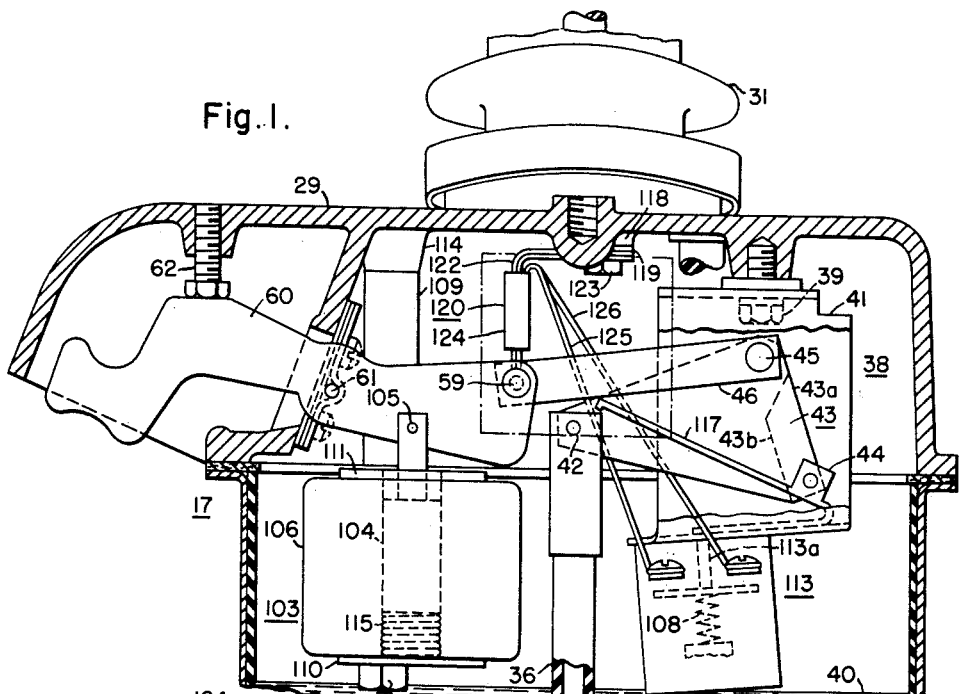

2,739,270
CIRCUIT INTERRUPTER FOR LOAD PICKUP

Andrew W. Edwards, East McKeesport, and Alvin W. Ogg, Pittsburgh, Pa., assignors to Westinghouse Electric Corporation, East Pittsburgh, Pa., a corporation of Pennsylvania Application December 8, 1951, Serial No. 260,606

12 Claims. (Cl. 317—37)

Our invention relates generally to circuit interrupters, and it has reference in particular to circuit interrupters which are adapted for sectionalizing a circuit after a loss of voltage, so as to facilitate pickup of the load on the circuit.

In distribution circuits the problem of loss of diversity of load in rural sections is becoming serious, and some sectionalizing means must be employed to effect reenergization after an outage. This is particularly so after a bus fault when the loss of diversity results in all of the intermittent loads such as refrigerators, pumps, blowers, and the like, being connected to the circuit awaiting reenergization. Such high currents are drawn on reenergization of the circuit that the regulation suffers, and in many instances the inrush current is greater than the circuit breaker or recloser can safely handle, causing it to open and operate to lockout. Sectionalizing of the circuit is therefore advantageous. While this has been done manually, an automatic system would be preferable.

Accordingly, it is one object of our invention to provide an automatic load pickup sectionalizing switch that is novel.

Another object of our invention is to provide in an automatic load pickup switch for a circuit for using thermal means for delaying opening of the switch upon loss of voltage on the circuit.

It is also an object of our invention to provide in a load pickup switch for connecting a load to a circuit, for using a switch having a releasable operating mechanism for maintaining the contacts closed, and for using a thermally responsive latch for preventing release of said mechanism for a predetermined time after voltage is removed from the circuit.

Yet another object of our invention is to provide in an automatic load pickup switch for connecting a load to a power circuit, for using a thermal latch for preventing opening of the switch until a predetermined time after voltage is removed from the power circuit, and for delaying reclosing of the switch until a predetermined variable time after voltage is restored.

With the foregoing and other objects in view, our invention consists in the systems, combinations, structures, parts, and methods of design and operation, hereinafter described and claimed, and illustrated in the accompanying drawing, wherein—

Figure 1 is a simplified partial vertical cross-sectional view of a switch device illustrative of our invention;

Fig. 2 is a diagrammatic view of a distribution system utilizing the switch device of Fig. 1; and Fig. 3 is a partial view of the operating mechanism of a switch device similar to that of Fig. 1, embodying the invention in another form.

Referring to Figs. 1 and 2 it will be seen that our invention may be embodied in a switch generally of the type disclosed in copending application Serial No. 187,566 of Andrew W. Edwards and Alvin W. Ogg, entitled Electrically Operated Switches and Sectionalizers and assigned to the assignee of the present invention, and now Patent No. 2,710,828, and wherein a switch 17 is enclosed within a metal tank 27, which is provided with an insulating liner 28, and which is surmounted by a top casting 29. An incoming line enters through a bushing 31 which terminates inside the tank. The circuit then continues, through a terminal contact 34 which constitutes one of the stationary contacts of the sectionalizer. The sectionalizer has two bushings, each with its lead passing through the bushing, and each bushing terminates, at its bottom, in one of the stationary contacts of the sectionalizers, but since Fig. 1 shows an approximate central section through the sectionalizer, the second and similar stationary contact and bushing are not visible. The contact 34 and the other stationary contact may be connected by a movable contact 20, shown as a contact bar or bridge which presses up against the underside of the stationary contacts in the closed position of the switch, and which is lowered by gravity (after being accelerated by a spring 98), to open the sectionalizer, upon the release of a pull rod 36, which is shown in the form of an upwardly extending insulating tube and may be provided with an operating mechanism 38 at the top.

The switch 17 can theoretically operate either in air, or in an insulating oil, or other insulating fluid. It is sometimes desirable to have the contacts 34—20 also operating in oil. We have consequently illustrated our apparatus, by way of example, as having the contacts 34—20 immersed in oil 40 which is contained in the tank 27.

The operating mechanism 38 is mounted in a substantially-hollow-rectangle-shaped frame 41 which is bolted to the underside of the top casting 29, as by a bolt 39. This operating mechanism 38 may be regarded as starting with the movable contact member 20, and including the upwardly extending insulating pull rod 36, the bottom end of which is connected to said movable contact member. Pivotally connected, at 42, to the top of the pull rod 36, is one of the two terminal pivot points of a rocker member or lever 43, which is shown, in its preferred form, as a triangular plate, having a portion reversely bent to provide a generally channel section at one end, with an end base portion 43a and a shortened rear leg portion 43b. The lever 43 may be disposed with its base line nearly horizontal, with two terminal pivot points 42 and 44 disposed near the ends of said base line, and having an upwardly extending apex portion which carries an intermediate rocker point 45, which is pivotally connected to a first end of a normally nearly horizontal link 46, which will be subsequently described. The second terminal pivot point 44 of the rocker member 43 is supported on the frame 41.

The link 46, which is pivoted at one end by a pivot 45 to the top of the triangular rocker member 43, has a second end which is pivoted, by a pivot 59, to the inner end of an operating handle 60. An intermediate point of the operating handle 60 is secured to a stationary pivotal support 61, which is carried within the top casting 29. The outer end of the operating handle 60 normally presses up against a stop screw 62 which is carried by the underside of the top plate of the top casting 29.

The lower end of the pull rod 36 may be aligned by means of insulating guide links 94 which are pivotally supported at one end by a pin 93 secured by means of angle brackets 96 secured to the lower ends of insulating supports 70 which depend from the top casting 29. The other ends of the links 94 may be connected to the lower end of the pull rod 36 by a pivot pin 95.

In order to provide for increasing the pressure between the movable contact member 20 and the stationary contacts, an actuating member 97 comprising, for example, a bar of iron, steel, or other magnetic material, may be slidably disposed on the pull rod 36 beneath the contact member 20, which is also slidably disposed on the pull rod and biased upwardly by a spring 98. An L-shaped guide 99 having an upper leg 100 with an opening to receive the pull rod, and ears 101 adjacent the lower ends of the vertical leg with openings to receive the pin 95, may be utilized to align the bridge contact member 20 and prevent it from turning on the pull rod 36. By making at least the upper leg 100 of a magnetic material, the attractive force between the actuating member 97 and the upper leg 100, resulting from the flow of current through the contact member 20, may be utilized to bias the contact member upwardly with a force proportional to the current, and in addition to the normal biasing force of the spring 98.

To provide for electrically operating the switch 17, electroresponsive operating means 103 may be provided. The electroresponsive means 103 may, for example, comprise an electromagnet having an armature 104 pivotally connected to the handle 60 by a pivot pin 105, and an operating winding 106. This winding may be disposed between plates 110 and 111 of magnetic material, which plates may be maintained in spaced relation by bolts 112 which magnetically link the plates and secure them as to an insulating support 109 depending from a boss 114 on the underside of the casting 29. The armature 104 is so disposed that when the winding 106 is deenergized, the armature will be actuated upwardly by a spring 115 disposed between the lower plate 110 and the armature. It will be pulled downwardly when the winding 106 is energized, by flux in the air gap between the lower plate 110 and the armature. This operates the lever 60 to open and close the switch. A cut-off switch 113, may be provided as shown, in conjunction with the switch 17. A hairpin spring lever 117 pivotally mounted on the pin 44 and actuated by the lever 46, may be disposed to actuate the operating member 113a down against the upward action of the spring 108 to open the cut-off switch when the main contacts 20—34 are closed.

In the normal or closed position of the linkage, as shown in Fig. 1, the link 46 is in toggle lock with respect to the operating handle 60. In other words, the pivotal point 59 of this toggle-linkage is below the line joining the two terminal pivots 61 and 45 of this toggle, so that weight or other opening bias of the movable contact member 20 tends to rock the rocker member 43 in a counterclockwise direction about its second terminal pivot-point 44, so that said rocker member presses the link 46 toward the operating handle 60 in such direction that most of the thrust is taken by the pivotal support 61 of the operating handle, but a small part of said thrust is transmitted to the abutment 62 for said operating handle, in the normal closed position of the mechanism. The weight or other biasing-force of the movable contact member 20 is borne by the pivot 44, which is supported on the frame 41.

In operation, current through the bridge contact 20 produces a magnetic flux which links the actuating member 97 and the upper leg 100 of the guide 99. These mutual flux linkages draw these members together. Since the guide member is secured to the pull rod 36, the slidable member 97 is urged upwardly and bears more firmly against the lower side of the contact member. This biasing force increases with current and thus is valuable in assisting to overcome any tendency of the switch to open under short circuit conditions.

In order to delay opening of the switch for a predetermined time after voltage is removed from the circuit, blocking means such as a stop 120 may be provided. This stop may, for example, be thermally responsive and comprise a substantially L-shaped bimetallic member 122 comprising inner and outer laminations of relatively high and low coefficients of expansion, such as, for example, brass and steel, respectively. The member may be suitably mounted by means of a bolt 123 on a boss 118 on the casting 29, with its depending leg normally clear of the pivot 59, but so arranged that when heated it will deflect into interfering relation with upward movement of the pin 59 as shown. This may be accomplished by using heating means such as the resistor 124, having terminal connections 125 and 126, and which may be disposed about the depending leg of the bimetallic member and connected by the switch 113 in circuit with the coil 106 to both heat the bimetallic member and also limit energization of the coil 106 after the switch 17 is closed. Insulation 119 may be interposed between the member 122 and the boss 118 if desired.

Referring to Fig. 2 it may be seen that the load pickup switch 17 may be connected in series circuit with sections 5 and 5a of a distribution circuit for connecting a load (not shown) on the section 5a to conductor 5. A reclosing circuit breaker 8 may connect the conductor 5 to a source conductor 6. The reclosing circuit breaker may be of any suitable type, such as disclosed in copending patent application Serial No. 719,572 of Herbert L. Rawlins, et al. entitled Circuit Interrupter, filed December 31, 1946, and assigned to the assignee of the present invention and now Patent No. 2,622,167. It comprises, generally, a solenoid coil 9 connected in series with the conductors 5 and 6 for opening its line contact 8a in the event of an overcurrent. A counting mechanism 10 operates after a predetermined number of opening operations to actuate toggle mechanism 11 upwardly and lock contact 8a in the open position.

A control relay 12 having an operating winding 13 energized from the conductor 5 through a distribution or potential transformer 14 is provided for effecting energization of the operating winding 106 of the switch 17. A dashpot 15 retards movement of relay 12 in both directions, so as to delay energization of winding 106 for a predetermined time after conductor 5 is energized, which time is proportional to the time the conductor may have been deenergized, up to a maximum time of from 15 to 30 minutes.

During operation the switch 17 is closed, and auxiliary switch contacts 113a are open. The resistor 124 is therefore connected in series with the operating winding 106 of the switch 17, limiting the current therethrough and thus reducing the heating thereof. The resistor 124 heats the bimetallic stop 122 and causes it to be actuated to the position, shown in Figs. 1 and 2, where it is directly above the pin 59 of the toggle levers 46 and 60. Thus the stop 122 is effective to prevent the spring 115 from actuating the armature 104 upward to break the toggle relation of levers 59 and 46, for a predetermined time after conductor 5 is deenergized, that is, until the stop member 122 cools sufficiently and flexes out of the way of the pin 59. Because the bimetallic stop has considerable thermal capacity, this may take from 2 to 5 minutes.

During opening and reclosing operations of the reclosing circuit breaker 8, the switch 17 will, therefore, remain closed. The relay 12 will be deenergized each time the breaker 8 opens, but will not open appreciably, because of the delay interposed by dashpot 15. Accordingly, should breaker 8 reclose and stay closed, the switch 17, which is prevented from opening by the blocking member 122, will also stay closed, since relay 12 will reclose upon return of voltage, and before the blocking member 122 permits switch 17 to open.

Should the breaker 8 open a predetermined number of times and lock open, as in the case of a permanent fault, the control relay 12 and closing winding 106 will both be deenergized for a relatively long time—until the recloser 8 is manually reclosed. During this interval, relay 12 continues towards reset, and the bimetallic stop 122 cools until it flexes sufficiently to clear pin 59. The spring 115 is thereupon effective to force armature 104 upward, moving pin 59 overcenter, and collapsing toggle levers 46 and 60, to permit counterclockwise rotation of lever 43. This permits contact rod 36 to drop, and open contacts 20—34.

Auxiliary switch 113 thereupon closes contacts 113a and shunts the resistor 124.

When the breaker 8 is reclosed, numerous loads such as refrigerators, pumps, etc. which are intermittently connected to the line, will be connected thereto. As soon as voltage appears on conductor 5, relay 12 commences to pickup, but cannot close its contacts for some time, which will be dependent on the time the conductor was deenergized. Accordingly, the breaker 8 will initially have to supply only the loads connected to conductor 5, so that the loss of diversity of load will not be too serious and the breaker will usually be able to handle such load.

After the time required for the relay 12 to operate, operating winding 106 is energized. Because contact 113a shunts resistor 124, the winding 106 is energized at a maximum value, and armature 104 pulls lever 60 in a clockwise direction against spring 115, restoring toggle levers 46 and 60 to their overcenter position shown, and closing contacts 20—34 to reconnect the load circuit conductor 5a to the source. Because conductor 5 was reconnected initially, followed by conductor 5a, the loss of diversity of load on neither is harmful.

In the event that there is a loss of voltage due to a bus fault, which loss of voltage continues for a relatively long time such as 20 minutes or one half hour, the loss of diversity of load will also be serious. Under such conditions, the control relay 12 will be deenergized long enough for it to reset, and the thermal stop 122 will have cooled sufficiently to permit the spring 115 to open the switch. When voltage is restored, the control relay 12 will be energized, but cannot immediately reclose. Accordingly, only a part of the load will be picked up initally after a time proportional to the outage relay 12 operates and completes a circuit for closing winding 106, closing the switch 17 and picking up the balance of the load.

Referring to Fig. 3 of the drawing, it will be seen that instead of using a spring 115 to open the switch and thermal blocking means to delay opening, as shown in Fig. 1, the spring 115 may be omitted. Operating winding 106 may be provided with armature 104 connected to the lever 60 by a pin 105, for operating the lever in a clockwise direction to place it in overcenter toggle relation with lever 46 for the purpose of closing the switch contacts, as hereinbefore explained in connection with Fig. 1.

Switch actuating means such as the bimetallic actuator arm 130 may be provided for normally engaging the pin 59 to move the pin upwardly and release the levers 46 and 60 from their overcenter toggle relation. The bimetallic arm may be mounted on the bracket 41 by one of the securing bolts 39 thereof. Arm 130 may be provided with heating means such as the resistor 124, having terminal leads 125 and 126 disposed to be connected by the switch 113 as shown in Fig. 2. Thus deflection of the arm 130 is effected when the switch device 17 is closed and the resistor 124 heats the arm 130, in a counterclockwise direction. This permits the toggle levers 46 and 60 to be securely held in overcenter toggle relation by the solenoid winding 106. When the winding 106 is deenergized for a sufficient time, the arm 130 cools and deflects in a clockwise direction, thereby raising the pin 59 and breaking the toggle relation of levers 46 and 60 to open the switch 17.

From the above description and the accompanying drawing it will be apparent that we have provided in a simple and efficient manner for effecting sectionalization of a load circuit for pickup purposes. By using a thermally responsive blocking means for preventing collapse of toggle levers in the switch operating mechanism, an inexpensive and reliable load pickup switch is provided. A switch embodying the principal features of our invention uses a large number of standard switch parts and provides a simple and durable operating mechanism.

Since certain changes may be made in the above described construction, and different embodiments of the invention may be made without departing from the scope of the invention, it is intended that all matter contained in the above description and shown in the accompanying drawing, shall be considered as illustrative and not in a limiting sense.

We claim as our invention:

1. A circuit interrupter comprising, separable contacts, releasable means for separating and reclosing said contacts, biasing means for effecting separation of said contacts, electroresponsive means operable to actuate said releasable means to and hold it in a releasable position against the bias of the biasing means, thermal blocking means preventing release of said releasable means for a predetermined time after voltage is removed from the circuit, and means for delaying energization of the electroresponsive means for a predetermined time after voltage is restored to the circuit.

2. In a circuit interrupter, separable contacts, operating means for separating said contacts including releasable means operable to one position to open said contacts and operable to a releasable position to close said contacts and maintain them closed, means biasing said releasable means to said one position, electroresponsive means operable to actuate said releasable means to said releasable position and maintain it in said position so long as voltage is applied to the electroresponsive means, and means engaging a part of the releasable means for maintaining said releasable means in said releasable position for a predetermined time after voltage is removed from said electroresponsive means.

3. A circuit interrupter comprising, separable contacts, an operating mechanism for said contacts including a pair of toggle levers having a common pivot operable to an overcenter toggle position to close said contacts, electroresponsive means energizable to operate said levers to and maintain them in said overcenter position so long as voltage is applied to the interrupter, means including a thermally responsive member engaging said common pivot for maintaining said levers in said position only for a predetermined time after voltage is removed from the circuit, and time delay means for delaying energization of the electroresponsive means for a predetermined time after voltage is applied to the circuit.

4. In a circuit interrupter, separable contacts, electroresponsive means for closing said contacts and holding them closed, means including a thermally responsive member effecting separation of said contacts a predetermined time after voltage is removed from the circuit, and relay means delaying reenergization of said electroresponsive means for a predetermined time after voltage is applied to the circuit.

5. In a circuit interrupter, separable contacts, an operating mechanism for said contacts, electroresponsive means for actuating said mechanism to close said contacts, resilient means biasing said contacts to separate them, thermally responsive means operable in response to voltage on a circuit to engage said mechanism and prevent separation of said contacts for a predetermined time after voltage is removed from the circuit, and relay means independent of the thermally responsive means delaying energization of said electroresponsive means for a predetermined time after voltage is applied to the circuit.

6. A load pickup switch for connecting a load to a power circuit comprising, separable contacts, an operating mechanism for said contacts, electroresponsive means operable in response to the application of voltage for actuating said mechanism to close said contacts, means for opening said contacts a predetermined time after loss of voltage on the electroresponsive means, said means including thermally responsive device having heating means connected in series with the electroresponsive means, switch means operated by the operating mechanism to shunt the heating means when the separable contacts are open, and means applying voltage to the electroresponsive means a predetermined time after it is applied to the power circuit.

7. In a circuit interrupter, separable contacts, an operating mechanism including releasable means effecting separation of said contacts, electroresponsive means operating said releasable means to close said contacts and hold them closed, means for opening said contacts including thermally responsive time delay means having a part engaging said mechanism and removable therefrom for effecting release of said releasable means a predetermined time after deenergization of the circuit, and circuit means including a resistance element for effecting operation of said time delay means and limiting energization of said electroresponsive means.

8. A circuit interrupter comprising, separable contacts, an operating mechanism for said contacts including a pair of toggle levers operable to an overcenter position to close said contacts, said toggle levers being biased to open said contacts, electroresponsive means for operating said mechanism to close the contacts, a bimetallic blocking member operable to engage a part of the operating mechanism and prevent movement of said toggle levers to open said contacts, resistance means for heating said bimetallic blocking member to render it operable, and circuit means connecting said resistance means in series circuit relation with electroresponsive means when the contacts are closed.

9. In a circuit interrupter, separable contacts, an operating mechanism for one of said contacts including a pair of toggle levers having a common pivot operable to an overcenter position to close said contacts, electroresponsive means having an armature connected to one of said levers for actuating the levers to said overcenter position, biasing means biasing the armature to move the levers away from said overcenter position, a bimetallic blocking member normally ineffective to prevent movement of the levers from said overcenter position, heating means actuating the bimetallic blocking member to interfere with said pivot and prevent actuation of the levers from said overcenter position for a predetermined time after deenergization of the heating means, and circuit means effectively connecting the heating means to the circuit only when the circuit interrupter is closed.

10. The combination in a pickup switch for connecting a load circuit to a power circuit, of separable contacts connecting the load circuit to the power circuit, electroresponsive means operable to actuate one of the contacts to engage the other contact, means biasing said one contact to separate it from the other contact when the contacts are engaged, bimetallic means for effecting separation of the contacts, heating means, circuit means connecting the heating means when the switch is closed for operating the bimetallic means to prevent separation of the contacts for a predetermined time after the power circuit is deenergized, and time delay means for connecting the electroresponsive means to be energized a predetermined time after reenergization of the power circuit.

11. In a load pickup switch for connecting a load to a power circuit, separable contacts, an operating mechanism for said contacts including a pair of toggle levers actuable to an overcenter position to close said contacts, electroresponsive means having an armature connected to one of said levers operable to actuate them to said overcenter position when voltage is applied to the electroresponsive means, means biasing the armature to actuate said lever to separate said contacts when they are closed, a thermal latch operable in response to application of voltage to the circuit to interfere mechanically with the operating mechanism to prevent actuation of said lever by the biasing means until a predetermined time after voltage is removed from said circuit, and separate means for delaying the application of voltage to said electroresponsive means for a predetermined time after it is applied to said circuit.

12. A circuit interrupter comprising, separable contacts, operating means for said contacts including a pair of toggle levers having a common pivot movable to an overcenter position to close said contacts, electroresponsive means operable to move said levers to said overcenter position, a bimetallic member normally positioned to engage said pivot and bias said levers away from said position to effect separation of said contacts, and heating means disposed to be energized when the contacts are closed to deflect said bimetallic member away from said biasing position.

References Cited in the file of this patent

UNITED STATES PATENTS

| | | |
|---|---|---|
| 1,272,444 | Holliday | July 16, 1918 |
| 1,272,447 | Jacobs | July 16, 1918 |
| 1,513,247 | James | Oct. 28, 1924 |
| 1,795,198 | Connell | Mar. 3, 1931 |
| 2,066,904 | Bartmess | Jan. 5, 1937 |
| 2,068,620 | Spurgeon | Jan. 19, 1937 |
| 2,575,740 | Warrington | Nov. 20, 1951 |
| 2,654,053 | Wallace et al. | Sept. 29, 1953 |

FOREIGN PATENTS

| | | |
|---|---|---|
| 232,579 | Great Britain | Mar. 31, 1925 |